3,331,738
3-IODO-4-HYDROXY-5-NITROBENZONITRILE AS AN ANTHELMINTIC
Raymond Frederick Collins, Harold Wood, Joshua Michael Stuart Lucas, High Ongar, and Jack Rosenbaum, Maidenhead, England, assignors to May & Baker Limited, Dagenham, England, a British company
No Drawing. Filed Dec. 10, 1965, Ser. No. 513,099
Claims priority, application Great Britain, Dec. 18, 1964, 51,644/64
10 Claims. (Cl. 167—53)

This invention relates to a method for the treatment of helminth infestations, and compositions and compounds of use in the method.

Helminth infestations are conditions of major importance causing serious health problems, including mortality, in domestic animals such as cattle, sheep, pigs, goats, dogs and poultry. These health problems may result in serious economic losses in domestic animals. Helminth infestations of particular importance in domestic animals are those of the gastro-intestinal tract caused by members of the family Trichostrongylidae, for example members of the genus Haemonchus, and those caused by members of the genus Fasciola, otherwise known as liver flukes.

As a result of research and experimentation, it has been found that 3-iodo-4-hydroxy-5-nitrobenzonitrile and its non-toxic salts possess valuable chemotherapeutic properties, having high anthelmintic activity, particularly against parasitic nematodes of the family Trichostrongylidae, for example *Haemonchus contortus*, and of the genus Ancylostoma, for example *Ancylostoma caninum*, and against parasitic trematodes of the genus Fasciola, for example *Fasciola hepatica*, at dosages which do not produce serious toxic side-effects in animals infested with these parasites.

According to the present invention, there is provided a method for the treatment of helminth infestations in domestic animals which comprises the administration to animal of 3-iodo-4-hydroxy-5-nitrobenzonitrile or non-toxic salts thereof in an amount sufficient to control the infestation.

By the term "non-toxic salts" is meant salts containing cations which are relatively innocuous to the animal organism in therapeutic dosages of the salts so that the beneficial anthelmintic properties inherent in the benzonitrile derivative are not vitiated by side-effects ascribable to the cation. Salts which may be used include alkali metal, e.g. lithium, sodium and potassium, alkaline earth metal, e.g. calcium and magnesium, other metals such as cadmium, ammonium, amine, amidine and quaternary ammonium, e.g. tetramethylammonium and N-benzyl-N, N-dimethyl-N-($\beta$-ethoxyethyl)ammonium, salts.

Examples of suitable amine salts are those formed with mono-, di- and tri-methylamine, mono-, di and tri-ethylamine, mono-, di- and tri-ethanolamine, isopropylamine, octylamine, dioctaylmethylamine, tributylamine, dimethylstearylamine, tri(3,5,5-trimethylhexyl)amine, 2-diethylamino-ethanol, 4-dimethylaminobutanol, 5-diethylaminopentanol, 4-dimethylamino-n-butyl(methyl)amine, 2-aminopropane-1,3-diol, 1-(4-dimethylamino-2-methoxyphenoxy)-5-phenyl-pentane, 5-diethylamino-2-aminopentane, 2,2'-methoxyethylpyridine, piperidine, piperazine, morpholine, 1-dimethyl-carbamoyl-4-methylpiperazine, sugar amines such as glucosamine, glucamine and N-substituted glucamine derivatives of the general formula $R_1R_2N.CH_2(CHOH)_4CH_2OH$ (wherein $R_1$ and $R_2$ may be the same or different and each represents a hydrogen atom or an alkyl group containing 1 to 6 carbon atoms, for example methyl, ethyl, propyl, butyl or hexyl, or a 2-hydroxyethyl or 2-hydroxypropyl group) and particularly N-methylglucamine, N-ethylglucamine and N-n-propylglucamine, and aminoacids such as aminoacetic and 2-amino-ethanesulphonic acids and their salts, for example their sodium and potassium salts. Examples of suitable amidine salts are those formed with formamidine, benzamidine and 1,5-bis(p-amidino-phenoxy)pentane. The quantities of the benzonitrile derivative, or non-toxic salts thereof, administered in the treatment of helminth infestations will vary with the product administered, the species of animal treated, the severity of the infection, the duration of treatment and the method of administration.

Fascioliasis, the disease caused by infestations with parasitic trematodes of the genus Fasciola, particularly *Fasciola hepatica*, presents, as hereinbefore indicated, a serious problem in domestic animals, particularly sheep and cattle, throughout the world and no entirely effective treatment is available. Effective treatment of the disease involves both the destruction of adult flukes, thus controlling the chronic disease and at the same time preventing the infection of the snail intermediate host by fluke eggs excreted onto the pasture by the infested animal, and the destruction of the earlier developmental stages of the fluke as soon as possible after entry into the body of the host, thus controlling the acute disease and preventing the chronic disease. Treatment of the acute disease caused by immature flukes is of particular importance since the damage to the liver produced by the flukes at this stage in their development frequently results in severe sickness and mortality amongst the infested, particularly young, animals such as lambs and calves. In practice most animals to be treated have acquired the infestation over an indefinite period of grazing and are harbouring flukes of various ages, both mature and immature, at the time of treatment. The remedies most widely used hitherto for the treatment of fascioliasis, carbon tetrachloride and hexachloroethane, do not provide a completely satisfactory answer to the problem since neither is effective against immature flukes at dosages which are well tolerated by the infested animal. In addition, the toxicity of carbon tetrachloride in cattle is such that it cannot be used with safety even at the lower dosages required against the mature fluke.

It has been claimed (Kendall, Brit. Vet J., 118, 1–10) that hexachlorophene is effective against flukes as young as 3–4 weeks old but the required dosage (ca. 40 mg. per kg. of animal body weight by oral administration) is such that severe toxic side-effects are frequently encountered.

According to a particular feature of the present invention, there is provided a method for the treatment of fascioliasis in domestic animals, such as sheep and cattle, against both the mature and immature developmental stages of *Fasciola hepatica* which comprises the administration to the animal of 3-iodo-4-hydroxy-5-nitrobenzonitrile or non-toxic salts thereof. In general, the benzonitrile derivative and its non-toxic salts are highly effective in the treatment of fascioliasis in domestic animals, particularly sheep and cattle, against mature flukes when administered orally in dosages of from 0.05 g. to 0.10 g. (in terms of the weight of 3-iodo-4-hydroxy-5-nitrobenzonitrile in the case of salts) per kg. of animal body weight and against both mature and immature flukes when administered parenterally, especially in the form of a highly water-soluble non-toxic salt, as hereinafter referred to in greater detail, more particularly the N-methylglucamine salt, in dosages of from 0.005 g. to 0.040 g. (in terms of the weight of 3-iodo-4-hydroxy-5-nitrobenzonitrile in the case of salts) per kg. of animal body weight, particularly good results being obtained in sheep and calves against mature flukes at dosages of from 0.008 g. to 0.033 g. per kg. of animal body weight and against immature flukes at dosages of from 0.017 to 0.040 g., and more especially 0.020 g., per kg. of animal body weight. At the above mentioned dosage levels, tolerance of the treatment by the animals is satisfactory, no serious toxic side-effects being encountered.

The parenteral administration of a highly water-soluble non-toxic salt of 3-iodo-4-hydroxy-5-nitrobenzonitrile, particularly the N-methylglucamine salt, forms an especially preferred aspect of this feature of the present invention since the dosages in terms of the benzonitrile derivative which are effective against the mature flukes are lower than those required for similar control when it or its non-toxic salts are given by oral administration. In addition, parenteral, particularly subcutaneous and intramuscular, administration in the form of a highly water-soluble non-toxic salt, such as the N-methylglucamine salt, is more effective against immature developmental stages of the fluke than oral administration of 3-iodo-4-hydroxy-5-nitrobenzonitrile or its non-toxic salts. Effectiveness against immature flukes in sheep and calves at well-tolerated dosages, i.e. 0.017 to 0.040 g. (in terms of 3-iodo-4-hydroxy-5-nitrobenzonitrile) per kg. of body weight, is of considerable importance since, as indicated above, compounds hitherto available for the treatment of fascioliasis are either ineffective against immature flukes or effective only at dosages at which severe toxic side-effects in the treated animal are likely to be encountered and in consequence do not provide completely satisfactory treatment of the disease.

According to a further particular feature of the present invention there is provided a method for the treatment of infestations of parasitic nematodes of the family Trichostrongylidae, particularly Haemonchus contortus, in domestic animals such as cattle, sheep and goats, which comprises the administration to the animal of 3-iodo-4-hydroxy-5-nitrobenzonitrile or non-toxic salts thereof. Preferably the benzonitrile derivative is administered parenterally, in the form of a sterile solution of a highly water-soluble non-toxic salt, more especially the N-methylglucamine salt.

The quantities of 3-iodo-4-hydroxy-5-nitrobenzonitrile or non-toxic salts thereof administered will vary with the product administered, the nature and severity of the infestation, the duration of treatment and the method of administration. Good results are obtained against all developmental stages of Haemonchus contortus in calves at a dosage of 0.025 g. (in terms of 3-iodo-4-hydroxy-5-nitrobenzonitrile) per kg. of animal body weight by intramuscular injection of an aqueous solution of the N-methylglucamine salt and at dosages of 0.0125 to 0.025 g. of 3-iodo-4-hydroxy-5-nitrobenzonitrile per kg. of animal body weight by oral administration.

According to a still further particular feature of the present invention, there is provided a method for the treatment of infestations of the parasitic nematode Ancylostoma caninum in dogs which comprises the administration to the animal of 3-iodo-4-hydroxy-5-nitrobenzonitrile or non-toxic salts thereof. The benzonitrile derivative may be administered parenterally in the form of a sterile solution of a highly water-soluble non-toxic salt, more especially the N-methylglucamine salt. The quantity administered will vary with the product administered, the severity of the infestation, the duration of treatment and the method of administration. Good results have been obtained at dosages of 0.005 to 0.010 g. (in terms of the 3-iodo-4-hydroxy-5-nitrobenzonitrile) per kg. of animal body weight by subcutaneous injection of an aqueous solution of the N-methylglucamine salt.

For oral administration, the benzonitrile derivative may be utilised as such or in the form of non-toxic salts, for example salts of low water-solubility, i.e. between about 0.01 and 5% w./v., for example the lithium, sodium, potassium, ammonium, calcium, magnesium, cadmium diethanolamine, triethanolamine, piperidine, piperazine 1,5-bis(p-amidinophenoxy)pentane formamidine, benzamidine and 1-(4-dimethylamino-2-methoxyphenoxy)-5-phenylpentane salts, although salts having higher water-solubility may, if desired, also be used.

For parenteral administration, the benzonitrile derivative is preferably utilised in the form of a highly water-soluble non-toxic salt, i.e. a salt which is more than 20% w./v. soluble in water at room temperature, for example the 2-diethylaminoethanol and glucosamine salts and glucamine and N-substituted glucamine salts as hereinbefore described wherein $R_1$ represents an alkyl group containing 1 to 4 carbon atoms or a 2-hydroxyethyl or 2-hydroxypropyl group and $R_2$ represents a hydrogen atom, particularly N-n-propylglucamine, N-ethylglucamine and N-methylglucamine, the last mentioned salt being especially suitable because of its particularly high water solubility which enables simple sterile aqueous solutions containing up to about 70% (42% of active ingredient) w./v. of the salt to be prepared and administered.

3-iodo-4-hydroxy-5-nitrobenzonitrile and its non-toxic salts are conveniently administered for therapeutic purposes in the form of compositions in a unit dosage form and the present invention further includes within its scope therapeutically useful veterinary compositions which comprise, as active ingredient at least one of 3-iodo-4-hydroxy-5-nitrobenzonitrile and its non-toxic salts, in association with a significant amount of a pharmaceutically-acceptable carrier or coating. The invention includes especially such compositions made up for parenteral, particularly subcutaneous and intra-muscular administration, particularly sterile aqueous solutions of highly water-soluble salts.

Solid compositions for oral administration include compressed tablets (including enteric coated tablets), pills, boluses, dispersible powders and granules. In such solid compositions one or more of the active compounds is, or are, admixed with at least one inert diluent such as calcium carbonate, potato starch, alginic acid, sucrose or lactose. The compositions may also comprise, as is normal practice, additional substances other than inert diluents, e.g. lubricating agents such as magnesium stearate.

Liquid compositions for oral administration include pharmaceutically-acceptable emulsions, solutions, suspensions, syrups and elixirs containing inert diluents commonly used in the art, such as water, liquid paraffin, tetrahydrofurfuryl alcohol, propylene glycol, polyethylene glycol, isopropyl myristate, glycerol-formal, propylene carbonate, N-methylacetamide and monomethylformamide. Besides inert diluents such compositions may also comprise adjuvants such as wetting, suspending and emulsifying agents and stabilising, thickening, perfuming, sweetening and flavouring agents. The compositions according to the invention for oral administration also include capsules of absorbable material such as gelatin containing one or more of the active substances with or without the addition of diluents or excipients.

Preparations according to the invention for parenteral administration include sterile aqueous, aqueous-organic and organic solutions, suspensions and emulsions. Examples of organic solvents or suspending media are propylene glycol, polyethylene glycol, tetrahydrofurfuryl alcohol, isopropyl myristate, glycerol-formal, propylene carbonate, N-methylacetamide, monomethylformamide, vegetable oils such as olive oil, and injectable organic esters such as ethyl oleate and mixtures thereof. These compositions may also contain adjuvants such as stabilising, preserving, wetting, emulsifying and dispensing agents. They may be sterilised by, for example, filtration through a bacteria-retaining filter, by incorporation in the compositions of sterilising agents, by irradiation, or by heating. They may also be manufactured in the form of sterile compositions, which can be dissolved in sterile water or some other sterile injectable medium immediately before use. As indicated above, sterile solutions, and sterile compositions which can be dissolved in sterile water immediately before use, of highly water-soluble salts, such as the N-methylglucamine salt, are particularly preferred preparations for parenteral, particularly subcutaneous and intra-muscular, administration.

The percentage of benzonitrile derivative, or non-toxic salt thereof, in the above compositions may be varied, it being necessary that it should constitute a proportion such that a suitable dosage for the therapeutic effect desired shall be obtained. In general compositions containing from about 5% to about 90% by weight of active ingredient are satisfactory.

For therapeutic purposes, particularly when continuous administration over a period of several days or more is desired, 3-iodo-4-hydroxy-5-nitrobenzonitrile and its non-toxic salts, may be administered, dispersed in or mixed with animal feedstuffs, drinking water and other liquids normally consumed by the animals, or in compositions containing the benzonitrile derivative or its non-toxic salts, dispersed in or mixed with any other suitable inert physiologically innocuous carrier or diluent which is orally administrable. By the term "inert physiologically innocuous carrier or diluent" is meant a carrier or diluent which is substantially non-reactive with the active ingredient and is not harmful to the animals on oral administration. Such compositions may be administered in the form of powders, pellets, solutions, suspensions and emulsions to the animals to supply the desired dosage of benzonitrile derivative or used as concentrates or supplements to be diluted, with additional carrier, feedstuffs, drinking water or other liquids normally consumed by the animals, before administration. Suitable inert physiologically innocuous carriers or diluents include wheat flour or meal, maize gluten, lactose, glucose, sucrose, talc, kalolin, calcium phosphate, calcium carbonate, potassium sulphate and diatomaceous earths such as kieselguhr. Concentrates or supplements intended for incorporation into drinking water or other liquids normally consumed by the animals to give solutions, emulsions or stable suspensions may also comprise the active ingredient in association with a surface-active wetting, dispersing or emulsifying agent such as sodium lauryl sulphate, polyoxyethylene (20) sorbitan mono-oleate or the condensation product of β-naphthalenesulphonic acid with formaldehyde, with or without a physiologically innocuous, preferably water-soluble, carrier or diluent, for example, sucrose, glucose or an inorganic salt such as potassium sulphate, or concentrates or supplements in the form of stable dispersions or solutions obtained by mixing aforesaid concentrates or supplements with water or some other suitable physiologically innocuous inert liquid carrier or diluent, or mixtures thereof.

The compositions described above may be prepared by mixing 3-iodo-4-hydroxy-5-nitrobenzonitrile or its non-toxic salts with the inert physiologically innocuous carriers or diluents in any manner known to the art. Solid compositions are conveniently prepared by intimately mixing or dispersing the benzonitrile derivative or its non-toxic salts uniformly throughout the feedstuffs or other solid carrier or diluent by methods such as grinding, stirring, milling or tumbling or by dissolving the benzonitrile derivative or its non-toxic salts in a suitable organic solvent, dispersing the solution so obtained in the feedstuff or other solid carrier or diluent and removing the solvent by any means known to the art. Medicated feedstuffs may also be prepared by mixing in concentrates or supplements containing higher concentrations of active ingredient to give feedstuffs throughout which the benzonitrile derivative or its non-toxic salts are uniformly distributed at the desired concentration. The desired concentration of active ingredient in the compositions of the present invention is obtained by the selection of an appropriate ratio of benzonitrile derivative or its non-toxic salts to carrier or diluent.

Medicated feedstuffs will normally contain between 0.001% and 3% by weight of 3-iodo-4-hydroxy-5-nitrobenzonitrile or its non-toxic salts to give the required dosage. Concentrates and supplements will normally contain between 5% and 90%, preferably 5% and 50%, by weight of the benzonitrile derivative or its non-toxic salts being, if desired, suitably diluted as hereinbefore described to give the required dosage.

Medicated animal feedstuffs, drinking water and other liquids normally consumed by the animals and compositions containing 3-iodo-4-hydroxy-5-nitrobenzonitrile or its non-toxic salts dispersed in or mixed with any other suitable inert carrier or diluent as hereinbefore described, including concentrates or supplements, form further features of the present invention.

Compositions according to the present invention may also contain bacteriostats, bactericidal agents, sporicidal agents and pharmaceutically-acceptable colouring agents. The compositions may also contain, if desired, other therapeutically active substances, for example 2-(4'-thiazoyl) benzimidazole, phenothiazine, cyanacethydrazide, hexachloroethane, piperazine and its salts such as piperazine adipate, dimethylstearylamine, 1 - diethylcarbamoyl - 4-ethylpiperazine, carbon tetrachloride, 3,3',5,5',6,6'-hexachloro-2,2'-dihydroxydiphenylmethane, tetrachloroethylene, 2 - (2 - methoxyethyl) pyridine, benzyl - dimethyl - 2-phenoxyethyl-ammonium salts, and phosphorus containing anthelmintics such as 0,0-dimethyl-2,2,2-trichlorohydroxyethylphosphonic acid.

The following examples illustrate compositions according to the present invention.

EXAMPLE I

A solution was prepared from the following:

N-methylglucamine salt of 3-iodo-4-hydroxy-5-nitrobenzonitrile—57.0 g.
Distilled water to 100 ml.

by dissolving the salt in distilled water and adding further distilled water to a volume of 100 ml. This solution was filtered and divided into ampoules in quantities such as to give a suitable unit dose per ampoule. The ampoules were sealed and sterilised in an autoclave to give a sterile solution suitable for parenteral injection. Alternatively, the filtered solution may be placed in a multi-dose container and sterilised in an autoclave to give a sterile solution suitable for parenteral injection.

The solution of the salt in distilled water for sterilisation may also be prepared as hereinafter described in Example IX.

EXAMPLE II

A solution was prepared from the following:

N-methylglucamine salt of 3-iodo-4-hydroxy-5-nitrobenzonitrile—57.0 g.
p-Chlorocresol—0.1 g.
Distilled water to 100 ml.

by dissolving a mixture of the salt and p-chlorocresol in distilled water and adding further distilled water to a volume of 100 ml. This solution was filtered, sealed into a multi-dose container and sterilised in an autoclave, to give a sterile solution suitable for parenteral injection.

EXAMPLE III

A solution was prepared from the following:

N-methylgucamine salt of 3-iodo-4-hydroxy-5-nitrobenzonitrile—57.0 g.
A solution of ethanol in distilled water (containing 10% v./v. of ethanol) to 100 ml.

by dissolving the salt in the aqueous ethanol and diluting with further aqueous ethanol to a volume of 100 ml. This solution was then treated as described in Example I to give ampoules containing unit doses of sterile solution suitable for parenteral injection.

Proceeding in a similar manner, ampoules containing unit doses of sterile solution suitable for parenteral injection were prepared from solutions containing the following ingredients and prepared as described above for the preparation of an aqueous ethanolic solution of the N-methyl glucamine salt of 3-iodo-4-hydroxy-5-nitrobenzonitrile;

(a)

N-methylglucamine salt of 3-iodo-4-hydroxy-5-nitrobenzonitrile—57.0 g.
A solution of polyethylene glycol (400) in distilled water (containing 10% v./v. of the glycol) to 100 ml.

(b)

N-methylglucamine salt of 3-iodo-4-hydroxy-5-nitrobenzonitrile—57.0 g.
A solution of N-methylglucamine in distilled water (containing 1.15% w./v. of N-methylglucamine) to 100 ml.

(c)

N-methylglucamine salt of 3-iodo-4-hydroxy-5-nitrobenzonitrile—57.0 g.
A solution of N-methylglucamine in distilled water (containing 2.3% w./v. of N-methylglucamine) to 100 ml.

(d)

N-methylglucamine salt of 3-iodo-4-hydroxy-5-nitrobenzonitrile—57.0 g.
A solution of N-methylglucamine in distilled water (containing 5% w./v. of N-methylglucamine) to 100 ml.

(e)

N-methylglucamine salt of 3-iodo-4-hydroxy-5-nitrobenzonitrile—57.0 g.
A solution of tetrahydrofurfuryl alcohol in distilled water (containing 5% v./v. of tetrahydrofurfuryl alcohol) to 100 ml.

(f)

N-methylglucamine salt of 3-iodo-4-hydroxy-5-nitrobenzonitrile—57.0 g.
A solution of N-methylacetamide in distilled water (containing 5% w./v. of N-methylacetamide) to 100 ml.

EXAMPLE IV 3-iodo-4-hydroxy-5-nitrobenzonitrile (16 g.) and polyethylene glycol 400 (100 ml.) were heated together on a steam bath (temp. 80–90° C.) until a clear solution was obtained.

This solution was divided into ampoules in quantities such as to give a suitable unit dose per ampoule. The ampoules were sealed and sterilised in an autoclave to give a sterile solution suitable for parenteral injection. Alternatively, the solution may be placed in a multi-dose container and sterilised in an autoclave to give a sterile solution suitable for parenteral injection.

Sterile solutions suitable for parenteral injection may also be obtained by similarly treating solutions prepared as described above but replacing the polyethylene glycol 400 by the same volume of tetrahydrofurfuryl alcohol, propylene glycol, isopropyl myristate, glycol-formal, propylene carbonate, N-methylacetamide and monomethylformamide. Mixtures of these solvents may also be utilised.

The activity of 3-iodo-4-hydroxy-5-nitrobenzonitrile and its non-toxic salts against *Fasciola hepatica* has been demonstrated against both mature and immature stages of the fluke.

(I) *Against mature flukes.*—In order to demonstrate activity against mature stages of the fluke, previously infection-free rabbits, calves and sheep were artifically infected with metacerariae of *Fasciola hepatica*, 10 metacercariae per rabbit and 100 to 300 metacercariae per calf or sheep. Infected animals received a single treatment when infestation was patent as indicated by the identification of fasciola eggs in the faeces (usually about 60 days after administration of the metacercariae). The treated animals were sacrificed about 10 weeks after infection and examined, activity being demonstrated by the absence of living mature flukes. All infected animals showed liver lesions indicative of an infection with *Fasciola hepatica*.

The following results were obtained:

(A) 3-iodo-4-hydroxy-5-nitrobenzonitrile administered as a suspension in tap water through an oesophagal tube to rabbits and as a drench to calves and sheep.

The following results were obtained:

| Dosage, g./kg. animal body weight | Rabbits | Sheep | Calves |
|---|---|---|---|
| | Number Cured/Number Treated | | |
| 0.185 | 3/3 | — | — |
| 0.1 | — | 1/1 | 2/2 |
| 0.09 | 3/3 | — | — |
| 0.075 | — | 2/2 | 2/2 |
| 0.05 | 3/3 | 0/2 | 0/3 |
| 0.025 | 3/3 | — | — |
| 0.0125 | 3/3 | — | — |

—means not tested at this dosage.

(B) Deep intra-muscular injection of the N-methylglucamine salt of 3-iodo-4-hydroxy-5-nitrobenzonitrile as a 66% w./v. sterile aqueous solution (containing 40% w./v. of 3-iodo-4-hydroxy-5-nitrobenzonitrile). The dosages given below are expressed in terms of the weight of 3-iodo-4-hydroxy-5-nitrobenzonitrile administered.

| Dosage, g./kg. animal body weight | Rabbits | Sheep | Calves |
|---|---|---|---|
| | Number Cured/Number Treated | | |
| 0.09 | 2/2 | — | — |
| 0.05 | — | 3/3 | — |
| 0.033 | — | 2/2 | — |
| 0.025 | 1/1 | — | 1/1 |
| 0.017 | 3/3 | 2/2 | 3/3 |
| 0.014 | 2/3 | — | — |
| 0.0125 | 1/2 | — | — |
| 0.008 | — | 3/3 | 2/2 |
| 0.0066 | — | — | 2/3 |
| 0.005 | — | 2/3 | 0/2 |

—means not tested at this dosage.

(C) Deep intra-muscular injection of a 16% w./v. solution of 3-iodo-4-hydroxy-5-nitrobenzonitrile in polyethylene glycol.

| Host | Dosage, g./kg. animal body weight | Number Cured/Number Treated |
|---|---|---|
| Rabbit | 0.09 | 2/2 |
| Do | 0.025 | 2/2 |
| Do | 0.0125 | 1/2 |
| Calf | 0.025 | 1/1 |

(II) *Against immature flukes.*—In order to demonstrate activity against immature stages of the fluke, previously infection-free rabbits, calves and sheep were artificially infected with metacercariae of *Fasciola hepatica*, 10 metacercariae per rabbit, 100–300 metacercariae per calf or sheep and, in Experiment C, 5,000 metacercariae per sheep.

In Experiments A and B a single administration was given to groups of infected animals at, respectively, 7, 14, 21, 28, 35, 42 and 49 days after infection and the animals sacrificed not less than 42 days after infection. Treatment was regarded as effective if no live flukes were found on post-mortem examination and the liver showed signs (fibrotic tracts; necrotic flukes; fluke eggs in the gall-bladder) of having been infected.

(A) Deep intra-muscular injection of the N-methylglucamine salt of 3-iodo-4-hydroxy-5-nitrobenzonitrile as a 66% w./v. sterile aqueous solution (containing 40% w./v. of 3-iodo-4-hydroxy-5-nitrobenzonitrile). The dosages in (A) and (C) given below are expressed in terms of the weight of 3-iodo-4-hydroxy-5-nitrobenzonitrile administered.

| Host | Dosage, g./kg. animal body weight | Number cured/Number treated | | | | | |
|---|---|---|---|---|---|---|---|
| | | Age of infection at dosing (in days) | | | | | |
| | | 14 | 21 | 28 | 35 | 42 | 49 |
| Rabbit | 0.090 | 1/1 | — | — | — | — | — |
| | 0.066 | — | 2/2 | — | — | — | — |
| | 0.050 | 0/2 | — | 3/3 | — | — | 1/1 |
| | 0.033 | — | 3/3 | 2/2 | — | — | — |
| | 0.017 | — | — | 1/5 | 1/2 | 3/3 | — |
| Sheep | 0.033 | — | 0/2 | 0/2 | (++) 0/2 | 2/2 | — |
| | 0.017 | — | 0/2 | 0/2 | 0/2 | 2/2 | 1/1 |
| Calf | 0.017 | — | 1/1 | 0/3 | 0/2 | (+) 1/2 | (+) 0/2 |

(+) <10 immature flukes 3–4 mm. in length (equivalent to 3–4 weeks of age) which had not reached maturity at time of sacrifice as shown by absence of eggs in gall-bladder; no adult flukes in any non-cured calf.
— not tested at this dosage/time.
(++) 1 and 6 flukes respectively found at post-mortem in comparison with 54 and 57 found at 4 weeks at this dosage.

(B) 3-Iodo-4-hydroxy-5-nitrobenzonitrile administered to rabbits through an oesophagal tube as a suspension in tap water.

| Dosage, g./kg. animal body weight | Number cured/Number treated | | |
|---|---|---|---|
| | Age of infection at dosing (in days) | | |
| | 14 | 21 | 28 |
| 0.185 | 0/2 | 1/3 | 3/3 |
| 0.066 | — | — | — |
| 0.050 | — | — | 2/4 |

— means not tested at this dosage/time.

(C) Subcutaneous injection of the N-methylglucamine salt of 3-iodo-4-hydroxy-5-nitrobenzonitrile to sheep treated with 5,000 metacercariae of *Fasciola hepatica* five weeks previously, and compared with untreated controls and sheep treated orally with carbon tetrachloride (5 ml.) and liquid paraffin (10 ml.). All sheep were killed 10 weeks after infection.

| Treatment | No. of sheep | Results | |
|---|---|---|---|
| | | Liver | Live flukes recovered |
| 20 mg./kg. s.c. | 2 | Normal | 0 |
| | | do | 0 |
| Carbon tetrachloride, 5 ml. Liquid paraffin, 10 ml. | 1 | Very fibrosed | 110 |
| Untreated controls | 2 | Very fibrosed | 560 |
| | | do | 523 |

(III) *Against both mature and immature flukes.*—In a further experiment to demonstrate the activity of 3-iodo-4-hydroxy-5-nitrobenzonitrile against a series of stages of fluke development, the N-methylglucamine salt was administered by a single subcutaneous injection as a 57% aqueous solution (equivalent to 34% w./v. solution of 3-iodo-4-hydroxy-5-nitrobenzonitrile) to sheep infected 28, 35, 42, 56 and 70 days previously with 100–300 metacercariae of *Fasciola hepatica*. The dosages given below are expressed in terms of the weight of 3-iodo-4-hydroxy-5-nitrobenzonitrile administered.

| Age of infestation at treatment | Dosage, mg./kg. animal body weight | Age of infestation at killing (days) | Number of flukes recovered | | Eggs in gall bladder |
|---|---|---|---|---|---|
| | | | Live | Necrotic | |
| 28 days | 34 | 87 | 13 | 0 | 0 |
| | | 94 | 7 | 0 | + |
| | | 101 | 20 | 0 | + |
| | | 105 | 5 | 0 | + |
| | | 90 | 16 | 0 | + |
| | 20 | 86 | 15 | 0 | + |
| | | 82 | 13 | 0 | + |
| | | 77 | 9 | 0 | + |
| | | 103 | 132 | 0 | + |
| 35 days | 34 | 105 | 0 | 0 | 0 |
| | | 159 | 3 | 0 | + |
| | | 102 | 1 | 0 | + |
| | | 91 | 45 | 0 | + |
| | 20 | 88 | 40 | 0 | + |
| | | 108 | 4 | 0 | + |
| | | 74 | 25 | 0 | + |
| | | 94 | 20 | | |
| 42 days | 20 | 81 | 0 | 7 | 0 |
| | | 77 | 0 | 21 | 0 |
| | | 81 | 0 | 8 | 0 |
| | | 86 | 0 | 0 | 0 |
| | | 63 | 0 | 5 | 0 |
| | 10 | 103 | 37 | 0 | + |
| | | 108 | 3 | 1 | + |
| | | 94 | 21 | 0 | + |
| | | 91 | 70 | 0 | + |
| 56 days | 20 | 84 | 0 | 11 | 0 |
| | | 83 | 0 | 77 | 0 |
| | | 78 | 0 | 0 | 0 |
| | | 83 | 0 | 36 | 0 |
| | 10 | 78 | 0 | 9 | 0 |
| | | 92 | 0 | 10 | 0 |
| | | 97 | 15 | 0 | 0 |
| 70 days | 20 | 81 | 0 | 2 | 0 |
| | 10 | 87 | 0 | 113 | 0 |
| | | 104 | 1 | 0 | + |
| | | 102 | 0 | 1 | — |
| Untreated, infected controls. | | 85 | 70 | 0 | + |
| | | [1]55 | 72 | 0 | + |
| | | 86 | 135 | 0 | + |
| | | 85 | 51 | 0 | + |
| | | 90 | 62 | 0 | + |
| | | 105 | 147 | 0 | + |
| | | 104 | 126 | 0 | + |
| | | 89 | 131 | | + |
| | | 91 | 98 | | + |
| | | 83 | 91 | | + |
| | | 184 | 101 | | + |

[1] Died.
+means eggs present in gall bladder.

The activity of 3-iodo-4-hydroxy-5-nitrobenzonitrile and its non-toxic salts against nematode infestations has been demonstrated in an experiment in which parasite-free calves each received a single oral dose of infective larvae of *Haemonchus contortus*. Three animals received respectively, at 7, 14 and 21 days after infection, a single deep intra-muscular injection of a 66% w./v. sterile aqueous solution of the N-methylglucamine salt of 3-iodo-4-hydroxy-5-nitrobenzonitrile (containing 40% w./v. of 3-iodo-4-hydroxy-5-nitrobenzonitrile), the volume of solution being such that a dosage equivalent to 0.025 g. of 3-iodo-4-hydroxy-5-nitrobenzonitrile per kg. of animal body weight was administered. A fourth animal was kept as an untreated control. The animals were sacrificed 28 days after infection and the number of worms present counted.

| Age of *Haemonchus contortus* infestation at treatment: | Number of worms at sacrifice |
|---|---|
| 7 | 0 |
| 14 | 0 |
| 21 | 0 |
| Untreated control | 4,200 |

These results show that the treatment was effective against both the mature and immature developmental forms of *Haemonchus contortus*.

Similar results were obtained when this experiment was repeated administering the salt solution by subcutaneous injection.

The activity of 3-iodo-4-hydroxy-5-nitrobenzonitrile and its non-toxic salts against nematode infections has also been demonstrated in an experiment in which two mixed breed puppies of about 3 months each received a single oral dose of infective larvae of *Ancylostoma canium* (canine hookworm) containing about 150 larvae. Faecal egg counts were carried out to confirm that the infection had been established. The animals were treated, on the 26th and 32nd day after infection respectively, with a subcutaneous injection of a 57% w./v. aqueous solution of the N-methylglucamine salt of 3-iodo-4-hydroxy-5-nitrobenzonitrile (containing 34% w./v. of 3-iodo-4-hydroxy-5-nitrobenzonitrile), diluted with distilled water so that 0.25 ml./kg. body weight could be administered for dosages equivalent to 10 mg./kg. body weight in the case of the first animal and 5 mg./kg. body weight in the case of the second animal. Seven days later the second dog received another subcutaneous injection, this time of 10 mg./kg. 3-iodo-4-hydroxy-5-nitrobenzonitrile. Activity was assessed by two methods:

(a) Egg counts were made on fresh faecal samples taken before and after treatment, using the saturated saline McMaster egg counting technique. When egg counts were too low for accuracy, total flotation of the eggs in 2 g. samples were carried out, and all the eggs recovered were counted.

(b) The total faecal material passed during 24 hour periods after dosing was collected and suspended in 5% formal saline. The suspension was passed through a 40 mesh British Standard sieve, and the material retained examined for the presence of hookworms.

| Animal | Pre-treatment egg count (eggs/g.) | Single dose, mg./kg. s.c. as nitrobenzonitrile | Post treatment egg count (eggs/g.) | No. of worms passed after treatment |
|---|---|---|---|---|
| I (female) (4.6 kg. body weight) | 2,900 | 10 | 0 | 51 |
| II (male) (5.6 kg. body weight) | 11,000 10 | 5 ¹10 | 10 0 | 35 16 |

¹ Second dose, given seven days after the first.

During the following two weeks neither animal passed further eggs or worms and were considered to have been cured of the infection. Both animals tolerated the doses given very well, and showed no signs of discomfort or toxic reactions.

3-iodo-4-hydroxy-5-nitrobenzonitrile may be prepared by the iodination, with an aqueous solution of an alkali metal, e.g. sodium or potassium, iodide and an alkali metal, e.g. sodium or potassium, iodate under acid conditions, of 4-cyano-2-nitrophenol, itself prepared by the nitration of p-cyanophenol with a mixture of nitric and acetic acids.

Salts with alkali metals, alkaline earth metals, other metals such as cadmium, ammonia, amidines and amines, and quaternary ammonium salts may be prepared by methods known per se for the preparation of salts of substituted phenols, for example treating 3-iodo-4-hydroxy-5-nitrobenzonitrile with a stoichiometric quantity or a slight excess, i.e. up to about 5%, of an alkali metal or alkali metal alkoxide, hydroxide, carbonate or bicarbonate, an alkaline earth metal hydroxide, cadmium chloride, an amidine hydrochloride, citrate or isethionate, ammonia or ammonium hydroxide, an amine or a quaternary ammonium hydroxide, in a suitable solvent such as water or a lower aliphatic alcohol, for example methanol or ethanol, or mixtures thereof.

Salts of low solubility may be prepared by heating 3-iodo-4-hydroxy-5-nitrobenzonitrile with a salt of the required cation of high solubility in the medium in question, e.g. sodium chloride in water. Suitable methods include:

(a) For alkali metal salts, by
  (i) dissolving 3-iodo-4-hydroxy-5-nitrobenzonitrile in an aqueous solution containing a slight excess of the alkali metal hydroxide, carbonate or bicarbonate and precipitating the salt from solution by salting out by the addition of the appropriate alkali metal halide, for example the chloride;
  (ii) treatment of 3-iodo-4-hydroxy-5-nitrobenzonitrile with a stoichiometric quantity of the alkali metal alkoxide in the corresponding alcohol (e.g. sodium methoxide in methanol or sodium ethoxide in ethanol) and collection of the salt by evaporation of the solvent and/or filtration;
  (iii) treatment of a solution of 3-iodo-4-hydroxy-5-nitrobenzonitrile in a suitable solvent such as methanol or ethanol with an aqueous solution of the alkali metal hydroxide and collection of the salt by evaporation of the solvent and/or filtration.

(b) For alkaline earth metal salts, by treatment of a solution of 3-iodo-4-hydroxy-5-nitrobenzonitrile in a suitable solvent such as methanol or ethanol with an aqueous solution of the alkaline earth metal hydroxide and collection of the salt by evaporation of the solvent and/or filtration.

(c) For the salts with amidines, by treatment of a soluble salt of 3-iodo-4-hydroxy-5-nitrobenzonitrile, such as the sodium salt, in a suitable solvent such as ethanol, with an aqueous solution of a water soluble salt of the amidine such as a hydrochloride, citrate or isethionate and collection of the salt by filtration.

(d) For salts with ammonia and volatile amines, by treatment of a solution of 3-iodo-4-hydroxy-5-nitrobenzonitrile in a suitable solvent such as methanol or ethanol with aqueous ammonium hydroxide solution or a solution of ammonia or the volatile amine in ethanol, and collection of the salt by filtration and/or evaporation of the solvent.

(e) For salts with non-volatile amines, by the processes hereinafter described for the preparation of highly water soluble salts of 3-iodo-4-hydroxy-5-nitrobenzonitrile and more particularly by treatment of a solution of 3-iodo-4-hydroxy-5-nitrobenzonitrile in methanol or ethanol with a solution of the non-volatile amine in methanol or ethanol and collection of the salt by evaporation of the solvent.

(f) For quaternary ammonium salts, by dissolving 3-iodo-4-hydroxy-5-nitrobenzonitrile and a quaternary ammonium hydroxide in water with heating and collection of the salt by filtration and/or evaporation of the solvent.

The following procedures may be conveniently used to prepare 3-iodo-4-hydroxy-5-nitrobenzonitrile and its salts:

*Procedure A.*—A solution of fuming nitric acid (d=1.51; 110 ml.) in glacial acetic acid (260 ml.) is added slowly to a solution of p-cyanophenol (250 g.) in glacial acetic acid (790 ml.) and the mixture heated for one hour at 50–55° C. After cooling in an ice-bath for 1 hour, the solution is poured onto ice-cold distilled water (600 ml.) and the yellow solid collected, washed with distilled water (approximately 1 litre) and dried at 100° C. for two hours, giving 4-cyano-2-nitrophenol (340 g.), M.P. 142–146° C.

A slurry of 4-cyano-2-nitrophenol (340 g.), sodium hydroxide (83 g.), potassium iodide (233 g.) and potassium iodate (150 g.) in distilled water (2.1 litres) is added to a stirred solution of ethanol (1.6 litres), distilled water (335 ml.) and concentrated sulphuric acid (170 ml.) maintained at 50° C. The mixture is heated under reflux for 2 hours and then stirred for 10 hours at room temperature. A small quantity of sodium bisulphite (about 5 g.) is added to decolourize the product, which is collected, washed with distilled water (approximately 1 litre) and dried at 100° C. for 3 hours to give 3-iodo-4-hydroxy-5-nitrobenzonitrile (567 g.) in the form of bright yellow crystals, M.P. 136–140° C. (Analysis: percentage iodine found=43.5, calculated=43.7.) Recrystallization from benzene (2 ml. per gramme) gave a product melting at 137–138° C. (Analysis: percentage iodine found=43.7.)

*Procedure B.*—A solution of lithium hydroxide (0.75 g.) in water (25 ml.) was added to 3-iodo-4-hydroxy-5-nitrobenzonitrile (5 g.) in hot ethanol (150 ml.) and the solvent removed by evaporation. Recrystallization of the residue from a mixture of ethyl acetate and light petroleum (B.P. 40–60° C.) gave the lithium salt of 3-iodo-4-hydroxy-5-nitrobenzonitrile, M.P. 240° C. (decomp.).

Proceeding in a similar manner, there were prepared the calcium salt, M.P. 250° C. (decomp.), and the magnesium salt, M.P.>300° C.

*Procedure C.*—A slight excess of aqueous sodium hydroxide solution (50% w./v.) was added to 3-iodo-4-hydroxy-5-nitrobenzonitrile (45 g.) in hot methanol (1 litre) and the solution filtered. The filtrate was evaporated to dryness and the yellow residue recrystallized from aqueous ethanol to give the sodium salt of 3-iodo-4-hydroxy-5-nitrobenzonitrile, M.P.>300° C.

Proceeding in a similar manner, there were prepared the ammonium salt, M.P. 250–254° C., and the potassium salt, M.P.>350° C.

*Procedure D.*—A solution of diethanolamine (1.3 g.) in ethanol (25 ml.) was added to 3-iodo-4-hydroxy-5-nitrobenzonitrile (5 g.) in hot ethanol (150 ml.) and the solution cooled for half an hour at 0° C. The yellow crystalline solid which precipitated was filtered off, giving the diethanolamine salt of 3-iodo-4-hydroxy-5-nitrobenzonitrile, M.P. 136–140° C.

Proceeding in a similar manner there were prepared the triethanolamine salt, M.P. 100–102° C., the piperidine salt, M.P. 173–176° C., the neutral piperazine salt, M.P. 250–252° C. (decomp.), the 1-(4-dimethylamino-2-methoxyphenoxy)-5-phenylpentane salt, M.P. 114–116° C., the isopropylamine salt, M.P. 163–165° C., the dimethylstearylamine salt, M.P. 55–57° C., the 2,2'-methoxyethylpyridine salt, M.P. 106–108° C., the methylamine salt, M.P. 215–220° C., the dimethylamine salt, M.P. 196–200° C., and the 2-phenylbenzimidazole salt, M.P. 225° C.

Proceeding in a similar manner but evaporating the ethanol solvent and recrystallising the residue from ethyl acetate, the ethylamine salt, M.P. 163–166° C., was obtained.

*Procedure E.*—3-iodo-4-hydroxy-5-nitrobenzonitrile (1.45 g.) and 5-diethylaminopentanol (0.8 g.) were dissolved in water (35 ml.) at a temperature of 80–90° C. to give a clear red solution of the 5-diethylaminopentanol salt of 3-iodo-4-hydroxy-5-nitrobenzonitrile.

Similarly prepared were solutions of the following salts: monoethanolamine, 4-dimethylaminobutanol, 5-diethylamino-2-aminopentane, taurine, glycine and tetramethylammonium (commencing with tetramethylammonium hydroxide).

*Procedure F.*—1,5-bis(p-amidinophenoxy) pentane isethionate (0.95 g.) in water (10 ml.) was added to a solution of the sodium salt of 3-iodo-4-hydroxy-5-nitrobenzonitrile (1 g.) in ethanol (25 ml.). Ice-cooling and filtration gave the neutral 1,5-bis(p-amidinophenoxy)pentane salt of 3-iodo-4-hydroxy-5-nitrobenzonitrile, M.P. 197–199° C.

Proceeding in a similar manner but commencing with, respectively, formamidine acetate, benzamidine hydrochloride, cadmium chloride and 1-diethylcarbamoyl-4-methylpiperazine citrate, there were obtained the formamidine salt, M.P. 214–218° C., the benzamidine salt, M.P. 228–230° C., the cadmium salt, M.P. 240–250° C., and the 1-diethylcarbamoyle-4-methylpiperazine salt, M.P. 142–144° C.

*Procedure G.*—30 g. of a commercial mixture of N-benzyl-N,N-dimethyl-N-(β-ethoxy)ethyl ammonium embonate and hydroxynaphthoate was heated with 900 ml. 2 N hydrochloric acid solution for 15 minutes on a steam bath. The solution was filtered, and the residue washed with hot water (100 ml.). Sodium iodide (90 g.) was added to the filtrate which was cooled in ice for half an hour. The solid product was filtered, washed with 5% sodium iodide solution, then washed with acetone, and recrystallised from ethanol to give N-benzyl-N,N-dimethyl-N-(β-ethoxy)-ethyl ammonium iodide (14.7 g.), M.P. 144–147° C. 10.3 g. of this iodide was refluxed for half an hour in 300 ml. aqeuous ethanol with the potassium salt of 3-iodo-4-hydroxy-5-nitrobenzonitrile (16.5 g.). A solid was precipitated by the addition of water, filtered, dried, and recrystallised from an ethyl acetate-diethyl ether mixture to give the N-benzyl-N,N-dimethyl-N-(β-ethoxy)ethyl ammonium salt of 3-iodo-4-hydroxy-5-nitrobenzonitrile (23 g.), M.P. 110–112° C.

The highly water soluble salts of 3-iodo-4-hydroxy-5-nitrobenzonitrile with 2-diethylaminoethanol and glucosamine, glucamine and N-substituted glucamine derivatives of the general formula $R_1R_2N.CH_2(CHOH)_4CH_2OH$ (wherein $R_1$ represents an alkyl group containing 1 to 4 carbon atoms or a 2-hydroxyethyl or 2-hydroxypropyl group and $R_2$ represents a hydrogen atom), for example N-n-propyl-, N-ethyl-, N-n-butyl and N-methyl-glucamine, are interalia new compounds not hitherto described in the literature and form a feature of the present invention together with their processes or preparation.

The above highly water soluble salts of 3-iodo-4-hydroxy-5-nitrobenzonitrile may be prepared:

(a) By dissolving 3-iodo-4-hydroxy-5-nitrobenzonitrile in a concentrated aqeuos solution of the amine and evaporating the water to isolate the salt. Preferably, however, the concentrated aqueous solution obtained is used directly, if necessary after sterilisation, in the treatment of helminth infestations without isolation of the salt.

(b) By dissolving 3-iodo-4-hydroxy-5-nitrobenzonitrile and the amine in a suitable solvent such as a lower aliphatic alcohol, for example methanol or ethanol or by mixing solutions of the benzonitrile derivative and the amine in such a suitable solvent. The salt may be isolated by evaporation of the solvent or by filtration, if necessary after cooling and the addition of a poor solvent for the salt, such as ethyl acetate. The solutions of the salt may, however, be used directly, if necessary after dilution with water and sterilisation, in the treatment of helminth infestations.

(c) By a double decomposition reaction of a soluble salt of 3-iodo-4-hydroxy-5-nitrobenzonitrile, such as the sodium salt, with a suitable salt of the amine, such as a hydrochloride, hydrobromide or sulphate. The reaction is conveniently effected by adding a solution of the amine salt in a solvent such as an alcohol, e.g. ethanol, to a hot solution of the soluble salt of 3-iodo-4-hydroxy-5-nitrobenzonitrile, e.g. the sodium salt, in the same solvent, e.g. an alcohol such as ethanol, and if required, heating the mixture under reflux to complete the reaction. The required amine salt may then be conveniently isolated by filtering the mixture to remove the insoluble inorganic salt, e.g. sodium chloride, and evaporating the filtrate to dryness. Alternatively, the solution may be filtered to remove the inorganic salt and the filtrate diluted with water to give a solution which may, if necessary after sterilisation, be used directly in the treatment of helminth infestations.

The following examples illustrate the preparation of new salts according to the present invention.

EXAMPLE V

N-methylglucamine (27 g.) in ethanol (50 ml.) was added to 3-iodo-4-hydroxy-5-nitrobenzonitrile (39.5 g.) in ethanol (150 ml.) and the mixture heated on a steam-bath for 15 minutes and then filtered. The filtrate was evaporated to dryness and the residue dissolved in distilled water (to 100 ml.) to give a bright red aqueous solution of the N-methylglucamine salt of 3-iodo-4-hydroxy-5-nitrobenzonitrile.

Proceeding in a similar manner there were prepared aqueous solutions of the following salts: the N-n-propylglucamine salt, the N-n-butylglucamine salt, the N-ethylglucamine salt and the glucosamine salt.

EXAMPLE VI 3-iodo-4-hydroxy-5-nitrobenzonitrile (19.8 g.) and N-methylglucamine (13.5 g.) were dissolved in hot methanol (150 ml.) and the solution filtered. Ethyl acetate (100 ml.) was added to the filtrate and the mixture cooled in an ice-bath for 2 hours and the precipitate filtered off, giving the N-methylglucamine salt of 3-iodo-4-hydroxy-5-nitrobenzonitrile as a yellow crystalline solid, M.P. 85–90° C.

EXAMPLE VII 3-iodo-4-hydroxy-5-nitrobenzonitrile (39.5 g.) and N-methylglucamine (26.5 g.) were dissolved in a minimum of distilled water (approximately 35 ml.) at 80–90° C., giving a red solution of the N-methylglucamine salt of 3-iodo-4-hydroxy-5-nitrobenzonitrile which was clarified by filtration. After cooling to room temperature distilled water was added to a total volume of 100 ml. giving a 66% w./v. solution of the salt.

EXAMPLE VIII

A solution of 2-diethylaminoethanol (6.0 g.) in ethanol (15 ml.) was added to 3-iodo-4-hydroxy-5-nitrobenzonitrile (14.5 g.) in hot ethanol (45 ml.). An equal volume of distilled water was added and the solution cooled for half an hour at 0° C. The precipitate was filtered off, giving the 2-diethylaminoethanol salt of 3-iodo-4-hydroxy-5-nitrobenzonitrile, M.P. 71–74° C.

EXAMPLE IX 3-iodo-4-hydroxy-5-nitrobenzonitrile (170.45 g.) and N-methylglucamine (114.55 g.) were mixed in a measuring cylinder (capacity 500 ml.) and distilled water (approximately 350 ml.) added. The mixture was heated in a steam bath until a clear solution was obtained and the cooled solution was diluted with distilled water (to 500 ml.) and filtered to give an orange-red 57% w./v. solution of the N-methylglucamine salt of 3-iodo-4-hydroxy-5-nitrobenzonitrile (pH 7.0).

We claim:

1. A method for the treatment of helminth infestations in domestic animals which comprises the administration to the animal of 3-iodo-4-hydroxy-5-nitrobenzonitrile or non-toxic salt thereof in an amount sufficient to control the infestation.

2. A method according to claim 1 wherein the helminth infestation is caused by members of the family Trichostrongylidae.

3. A method according to claim 1 wherein the helminth infestation is caused by members of the genus Haemonchus, Ancylostoma or Fasciola.

4. A method according to claim 1 wherein the helminth infestation is caused by *Fasciola heptaica*.

5. A method according to claim 1 for the treatment of fascioliasis in domestic animals wherein 3-iodo-4-hydroxy-5-nitrobenzonitrile or non-toxic salt thereof is administered orally to the animal in a dosage of from 0.05 g. to 0.10 g. of 3-iodo-4-hydroxy-5-nitrobenzonitrile per kilogramme of animal body weight.

6. A method according to claim 1 for the treatment of fascioliasis in domestic animals wherein 3-iodo-4-hydroxy-5-nitrobenzonitrile or non-toxic salt thereof is administered parenterally to the animal in a dosage of from 0.005 g. to 0.040 g. of 3-iodo-4-hydroxy-5-nitrobenzonitrile per kilogramme of animal body weight.

7. A method according to claim 1 for the treatment of infestations of parasitic nematodes of the family Trichostrongylidae in domestic animals wherein 3-iodo-4-hydroxy-5-nitrobenzonitrile or non-toxic salt thereof is administered to the animal in a dosage of from 0.0125 g. to 0.025 g. of 3-iodo-4-hydroxy-5-nitrobenzonitrile per kilogramme of animal body weight.

8. A method according to claim 1 for the treatment of infestations of the plastic nematode *Ancylostoma caninum* in dogs wherein 3-iodo-4-hydroxy-5-nitrobenzonitrile or non-toxic salt thereof is administered to the dog in a dosage of from 0.005 g. to 0.01 g. of 3-iodo-4-hydroxy-5-nitrobenzonitrile per kilogramme of animal body weight.

9. An anthelmintic composition comprising an animal feedstuff and, as an anthelmintic, 3-iodo-4-hydroxy-5-nitrobenzonitrile or non-toxic salt thereof, the amount of 3-iodo-4-hydroxy-5-nitrobenzonitrile being 0.001% to 3% by weight of the feedstuff.

10. An anthelmintic composition comprising an animal feed stuff concentrate or supplement containing, as an anthelmintic, a proportion of 3-iodo-4-hydroxy-5-nitrobenzonitrile, or non-toxic salt thereof, between 5% and 90% by weight.

References Cited

FOREIGN PATENTS 1,375,311  9/1964  France.

ALBERT T. MEYERS, *Primary Examiner.*

JULIAN S. LEVITT, *Examiner.*

R. BARRESE, *Assistant Examiner.*